United States Patent
Jasra et al.

(10) Patent No.: US 7,407,906 B2
(45) Date of Patent: *Aug. 5, 2008

(54) PROCESS FOR THE PREPARATION OF A MOLECULAR SIEVE ADSORBENT FOR THE ADSORPTIVE DEHYDRATION OF ALCOHOLS

(75) Inventors: Raksh Vir Jasra, Gujarat (IN); Jince Sebastian, Gujarat (IN); Chintansinh Dharmendrasinh Chudasama, Gujarat (IN)

(73) Assignee: Council of Scientific and Industrial Research (IN)

( * ) Notice: Subject to any disclaimer, the term of this patent is extended or adjusted under 35 U.S.C. 154(b) by 87 days.

This patent is subject to a terminal disclaimer.

(21) Appl. No.: 11/297,523

(22) Filed: Dec. 8, 2005

(65) Prior Publication Data

US 2006/0287189 A1 Dec. 21, 2006

Related U.S. Application Data

(63) Continuation of application No. 10/726,748, filed on Dec. 2, 2003, now abandoned.

(51) Int. Cl.
*B01J 20/18* (2006.01)
*B01J 29/06* (2006.01)

(52) U.S. Cl. .............................. 502/60; 502/63; 502/85

(58) Field of Classification Search ................. 502/60, 502/63, 64, 85
See application file for complete search history.

(56) References Cited

U.S. PATENT DOCUMENTS

| | | | |
|---|---|---|---|
| 1,459,699 A | 6/1923 | Ruymbeke | |
| 1,830,469 A | 10/1931 | Keyes | |
| 4,161,429 A | 7/1979 | Baiel et al. | |
| 4,217,178 A | 8/1980 | Katzen et al. | |
| 4,256,541 A | 3/1981 | Muller et al. | |
| 4,273,621 A | 6/1981 | Fornoff | |
| 4,277,635 A | 7/1981 | Oulman et al. | |
| 4,301,312 A | 11/1981 | Feder et al. | |
| 4,305,845 A * | 12/1981 | Tu ............................... | 502/64 |
| 4,306,884 A | 12/1981 | Roth | |
| 4,306,940 A | 12/1981 | Zenty | |
| 4,306,942 A | 12/1981 | Brush et al. | |
| 4,308,106 A | 12/1981 | Mannfeld | |
| 4,346,241 A | 8/1982 | Feldman | |
| 4,349,416 A | 9/1982 | Brandt et al. | |
| 4,351,732 A | 9/1982 | Psaras et al. | |
| 4,453,952 A * | 6/1984 | Izumi et al. .................... | 95/138 |
| 4,542,115 A * | 9/1985 | Strack et al. ................... | 502/64 |
| 4,746,332 A * | 5/1988 | Tomomura et al. ............. | 95/138 |
| 4,950,312 A * | 8/1990 | Puppe et al. ................... | 95/130 |
| 6,180,549 B1 * | 1/2001 | Mazany et al. ................ | 502/64 |
| 6,680,271 B1 * | 1/2004 | Heindl et al. .................. | 502/64 |
| 6,878,657 B2 * | 4/2005 | Jasra et al. ..................... | 502/64 |

* cited by examiner

*Primary Examiner*—David M Brunsman
(74) *Attorney, Agent, or Firm*—Alston & Bird LLP

(57) ABSTRACT

This invention relates to the use of pore mouth control of microporous solids for developing novel molecular sieve adsorbents and their potential in the drying of alcohols. More specifically, the invention relates to the manufacture and use of a molecular sieve adsorbent, which selectively adsorbs water from azeotropic alcohol-water mixtures by pore mouth control of microporous solids with liquid phase metal alkoxide deposition on the external surface at ambient conditions of temperature and pressure. The prepared adsorbent is therefore useful for the commercial drying of alcohols.

14 Claims, No Drawings

PROCESS FOR THE PREPARATION OF A MOLECULAR SIEVE ADSORBENT FOR THE ADSORPTIVE DEHYDRATION OF ALCOHOLS

CROSS-REFERENCE TO RELATED APPLICATIONS

This application is a continuation of U.S. patent application Ser. No. 10/726,748, now abandoned, filed Dec. 2, 2003, which is hereby incorporated herein in its entirety by reference.

FIELD OF THE INVENTION

The present invention relates to a process for the preparation of a molecular sieve adsorbent for the adsorptive dehydration of alcohols.

The invention relates to the preparation and use of surface modified zeolites (activated molecular sieve) in the dehydration of alcohols. More specifically, the invention relates to the preparation and use of a molecular sieve adsorbent, which selectively removes water from a water-ethanol azeotrope obtained from distillation of the crude synthetic or fermentation feedstock.

BACKGROUND AND PRIOR ART

The use of anhydrous alcohol (99.5 vol. % ethanol) has become an important consideration as a means of saving gasoline produced from high-cost crude oil. It is a well-established fact that up to 20 percent anhydrous ethanol can be blended with gasoline to obtain a relatively high-octane antiknock fuel, which can be used for internal combustion engines. With some engine modification, anhydrous ethanol can be used as the fuel directly.

Alcohol/water mixtures, such as those produced by fermentation of biomass material, form a single liquid phase that usually contains more or less equal volumes of ethanol and water, at least after initial distillation. Such mixtures are separated cyclohexane, etc. to yield an anhydrous alcohol fraction, which may contain minor amounts of other alcohols, such as propyl or butyl. Adsorption and solvent extraction are alternative or supplemental methods of separating alcohol and water. An increasing use of alcohol is seen for fuel, often in admixture with fossil fuels, such as gasoline or even diesel oil, for example, in which anhydrous conditions are favoured.

Over the past 30 years a series of distillation systems have been developed for the efficient recovery of ethanol from synthetic and fermentation feedstock. These units produce high-grade industrial alcohol, anhydrous alcohol, alcoholic spirits, and ethanol for motor fuels. Ethanol quality and recovery have been improved while at the same time, energy consumption has decreased.

Synthetic ethanol is purified in a simple three-column distillation unit wherein the recovery is 98%, and the high-grade product contains less than 20 mg/kg of total impurities and has a permanganate time of over 60 min.

The following are key features for the efficient recovery of high-grade ALCOHOL especially ethanol from fermentation feed stocks:

1) Extractive distillation results in a higher degree of purity than is possible in conventional purification columns. Both investment and operating costs are reduced.
2) Pressure-cascading installations and heat pumps permit substantial heat recovery and recycling, thus minimizing heat loss and steam consumption. Virtually all (95-99%) the ethanol in the crude feed is recovered as high-grade product.
3) Advanced control systems ensure stable operating conditions. Product quality can be maintained with a total impurity content of less than 50 mg/kg and a permanganate time of over 45 min.
4) Energy requirements are minimized. The flash heat recovered from the grain-cooking system is used to heat the ethanol distillation unit, thus reducing the energy consumption for ethanol production by ca. 10%. Use of a vapour recompression technique can reduce the energy required for the evaporation of stillage to as little as one-tenth of that required in a triple- or quadruple-effect evaporator.

With the ready availability of 95% alcohol through distillation, it might be expected that obtaining 100% (water free) alcohol would provide little problem. However, this is not the case, for no matter how efficient or long the distillation process, 95% alcohol or any lower-strength solution cannot be further concentrated beyond about a 96.4% alcohol solution by weight under standard conditions. At approximately that point, equilibrium is reached in which the liquid and vapour mixtures have the same composition. This is called an azeotrope or a constant-boiling mixture. In the case of ethyl alcohol, this is a binary azeotrope of the minimum-boiling variety. It has been reported that pressure changes affect this azeotropic mixture.

To produce anhydrous ethanol, the water-ethanol azeotrope obtained from distillation of the crude synthetic or fermentation feedstock must be dehydrated. For economic reasons, large distilleries rely mostly on azeotropic distillation for ethanol dehydration. Benzene has been used as an azeotropic dehydrating (entraining) agent in many plants, but some concern exists about its carcinogenicity and toxicity. Cyclohexane and ethylene glycol are used in some distilleries as effective dehydrating agents.

Some smaller ethanol plants use molecular sieve adsorption techniques to dry the ethanol azeotrope. Pervaporation through semipermeable membranes or use of a solid dehydrating agent may reduce energy and equipment costs.

Growing requirements for anhydrous ethanol for use in motor fuel gasoline blends require systems that operate with a minimum of energy and that are also reliable in continuous operation. Although production and blending of ethanol with gasoline have been practiced in different countries during the past forty years, the use of ethanol in such blends has been limited because of the relatively high costs of production.

The conventional distillation system for recovering motor fuel grade anhydrous ethanol from a dilute feedstock, such as fermented beer or synthetic crude alcohol, utilizes the three essential steps: (i) stripping and rectifying operation; (ii) dehydration; and (iii) condensation and decantation in three different towers. In the first tower the feedstock containing, 6 to 10 vol. % ethanol is subjected to a preliminary stripping and rectifying operation in which the concentration of water is materially reduced and concentrated ethanol stream is removed which contains in the order of 95 vol. % ethanol, thereby approaching the ethanol-water azeotrope composition of about 97 vol. % ethanol. The concentrated ethanol stream is next subjected to azeotropic distillation in the second or dehydrating tower using a suitable azeotropic or entraining agent, usually benzene or a benzene-heptane mixture. This results in removal of most of the remaining water, and the desired motor fuel grade anhydrous ethanol product (99.5 vol. %) is recovered from the dehydrating tower. The third tower of the system comprises a stripping tower in which the benzene or other azeotropic agent is recovered from the water-rich phase following condensation and decantation of the azeotropic overhead stream from the dehydrating tower.

One of the key elements in the high operating cost of the above described conventional distillation system is the high thermal energy requirement of the system, particularly steam consumption. The conventional system also has other serious shortcomings that detract from the commercial feasibility of the use of anhydrous ethanol as motor fuel. For example, the stripper-rectifier tower is occasionally operated under super atmospheric pressure, which results in higher temperatures, which in turn cause rapid fouling and plugging of the trays. As a consequence, periodic interruption of the operation is necessary to permit cleaning of the tower with resultant high maintenance costs. Furthermore, the conventional system does not include adequate provision to overcome the operating difficulties and product quality problems caused by the presence of higher boiling and lower boiling impurities in the feedstock.

In the prior art, to satisfy the ever-growing demand for absolute alcohol on a commercial scale, several continuous methods have been used. The first, based on a patent issued to Donald B. Keyes (U.S. Pat. No. 1,830,469) relies upon the dehydration of ethyl alcohol by the formation of a ternary azeotrope with benzene, ethyl alcohol and the remaining water in a 95% alcohol solution. This azeotropic mixture, having a low boiling point, is distilled off and must be separated by further secondary operations, leaving anhydrous ethyl alcohol at the bottom of the rectification column. Many other compounds have been suggested for use in similar azeotropic distillations, including ethyl ether, methylene chloride, isobutylene, isooctane, gasoline, benzene and naphtha, isopropyl ether, methyl alcohol and acetone. All of these distillations suffer from similar problems, however, those being increased cost and increased danger from fire or explosion during processing due to the added components.

A second process, based on the patent to Joseph Van Ruymbeke (U.S. Pat. No. 1,459,699) relies upon a reflux of glycerine in the column to act as a dehydrating agent. The glycerine and water pass out at the bottom of the still with the distillate being anhydrous ethyl alcohol. Considerable alcohol is caught up with the glycerine and water, however, and must be recovered in a second rectifying still. Yet another method, reported to be the earliest of its kind, utilizes anhydrous potassium carbonate as the drying agent. Many other inorganic compounds have been similarly studied, such as calcium oxide, calcium carbide, calcium sulphate, calcium aluminium oxide, aluminium and mercuric chloride, zinc chloride and sodium hydroxide, some of which are suggested as additives in the glycerine refluxing process mentioned above. The limitation of this processes are that its required two-step rectifying column and in another additive inorganic materials are not eco-friendly.

U.S. Pat. No. 4,161,429 (1979) to J. J. Baiel, et al. discloses a high-pressure (100-200 Psi) azeotropic distillation process of ethanol conducted in the absence of oxygen using pentanes and cyclohexane as entrainers. The drawbacks associated with the process are: (i) it requires high-pressure distillation; and (ii) continuously maintaining the oxygen free atmosphere is difficult.

U.S. Pat. No. 4,217,178 (1980) to R. Katzen, et al. discloses an improved distillation method for obtaining motor fuel grade anhydrous ethanol from fermentation or synthetic feedstock. The three-tower system used in the anhydrous ethanol production comprises a stripper-rectifier tower in which the dilute feedstock is converted to a concentrated ethanol stream, a dehydrating tower in which water is removed from the concentrated ethanol stream by azeotropic distillation, and a stripper tower for recovering the azeotropic agent. The limitations of this process are the high operating pressure and the difficulty in complete removal of the azeotropic agent from the anhydrous ethanol.

U.S. Pat. No. 4,256,541 (1981) to W. C. Muller, et al. discloses a method for distillation of anhydrous (absolute) ethanol with high thermal efficiency from any dilute feedstock using cyclohexane as the azeotrope-forming agent. The limitation of the process is that the process involves the use of cyclohexane as azeotropic forming agent during the azeotropic distillation.

U.S. Pat. No. 4,273,621 (1981) to L. L. Fornoff discloses a process for dehydrating aqueous ethanol utilizing a high-pressure distillation with a single distillation column of an aqueous ethanol admixture, to achieve a vapour phase ethanol-water admixture containing about 90%, by weight, of ethanol, and then drying the vaporous admixture, in the presence of $CO_2$, with a crystalline zeolite type 3A. The limitations of this process are the low water adsorption capacity and low hydrothermal stability of the zeolite 3A type adsorbent.

U.S. Pat. No. 4,277,635 (1981) to C. S. Oulman, et al. discloses a process for concentrating relatively dilute aqueous solutions of ethanol by passing through a bed of a crystalline silica polymorph, such as silicalite, to adsorb the ethanol with residual dilute feed in contact with the bed, which is displaced by passing concentrated aqueous ethanol through the bed without displacing the adsorbed ethanol. A product concentrate is then obtained by removing the adsorbed ethanol from the bed together with at least a portion of the concentrated aqueous ethanol used as the displacer liquid. The limitation of the process is the requirement of passing concentrated ethanol for the recovery of the anhydrous ethanol.

U.S. Pat. No. 4,301,312 (1981) to H. M. Feder, et al. discloses a process for the production of anhydrous ethanol by using a transition metal carbonyl and a tertiary amine as a homogeneous catalytic system in methanol or a less volatile solvent to react methanol with carbon monoxide and hydrogen gas producing ethanol and carbon dioxide. The gas contains a high carbon monoxide to hydrogen ratio as is present in a typical gasifier product. The reaction has potential for anhydrous ethanol production as carbon dioxide rather than water is produced. The only other significant by product is methane. The drawbacks of the process are that it involves the use of inflammable hydrogen and carbon monoxide and the formation of methane by-product.

U.S. Pat. No. 4,306,884 (1981) to E. R. Roth discloses a process for the separation of alcohol/water mixtures by extraction of alcohol with a solvent especially suited to such extraction and subsequent removal with addition of gasoline between the solvent extraction and solvent recovery steps. The limitation of the process is that it can produce only denatured ethanol, which contains the solvents used for the extraction of ethanol.

U.S. Pat. No. 4,306,940 (1981) to S. Zenty discloses a process and apparatus especially suited for distilling alcohol from aqueous fermentation liquors wherein liquid vapours from a liquid mixture is pre heated with the product. The limitation of the process is that it can produce only a water-ethanol azeotropic mixture containing about 95% of ethanol. The production of anhydrous ethanol requires additional purification steps.

U.S. Pat. No. 4,306,942 (1981) to B. F. Brush, et al. discloses an improved distillation method and apparatus for recovering hydrous ethanol from fermentation or synthetic feedstock with a multiple heat exchange steps. The limitation of the process is that it can produce only a water-ethanol azeotropic mixture containing about 95% of ethanol. Anhydrous ethanol production requires additional dehydration steps.

U.S. Pat. No. 4,308,106 (1981) to R. L. Mannfeld provides a process and still for removing substantially all water from an alcohol-containing solution using a rectification column under reduced pressure of about 40 mmHg or less to get alcohol having a water content of about 2% by volume or less. The limitation of the process is that maintaining very low pressure for the distillation is difficult and needs specially designed pumps.

U.S. Pat. No. 4,346,241 (1982) to J. Feldman provides a process for obtaining substantially anhydrous ethanol from a dilute aqueous ethanol solution in which the ethanol stream is subjected to liquid-liquid extraction to provide an ethanol-poor raffinate phase and an ethanol-rich extract phase. The ethanol present in said latter phase is concentrated in a rectifying column to provide an aqueous ethanol of high proof and the concentrated ethanol is azeotropically distilled in an anhydrous column operated under substantially super atmospheric pressure at high temperature. The drawbacks associated with the process are the use of amines as the extactant for the extraction of ethanol. Also, multiple steps are involved which increases the unit operation as well as the time for dehydration.

U.S. Pat. No. 4,349,416 (1982) to H. S. Brandt, et al. discloses a process and apparatus for the separation of components from a mixture, which forms an azeotrope, by subjecting the mixture to extractive distillation to remove one of the components and regeneration to separate another component from the extracting agent added to the extractive distillation column. The drawbacks associated with the process are the use of azeotropic forming agents and the extractive distillation process involved in the separation.

U.S. Pat. No. 4,351,732 (1982) to J. D. Psaras, et al. provides a process and apparatus for dehydrating liquid phase ethanol in an adsorber unit containing at least two towers that cycle between adsorption and desorption cycles, characterized in the desorption cycle by an indirect heating volatilisation of absorbed and adsorbed liquid at ambient pressures, and by a final stages desorption under sub-atmospheric pressures. The limitations of the process are the low water adsorption selectivity and capacity of the adsorbent.

U.S. Pat. No. 4,366,032 (1982) to P. Mikitenko, et al. provides a process for dehydrating an aliphatic alcohols-water mixture wherein the alcohols-water mixture is subjected to a first fractionation in the presence of a selective solvent, giving a vapour effluent containing dehydrated light alcohols and a liquid phase containing heavy alcohols, water and the selective solvent. Said liquid phase is subjected to a second fractionation giving as vapour effluent an heteroazeotropic mixture of water and heavy alcohols and a liquid effluent. The limitations of the process are the use of azeotropic forming agents and the extractive distillation process involved in distillation process.

U.S. Pat. No. 4,372,822 (1983) to W. C. Muller, et al. discloses a process for the preparation of anhydrous ethanol by distillation with thermal efficiency from a dilute feedstock. The columns are operated at substantially super atmospheric pressure with thermal values recovered from these columns being used in the operation of the rectifying column. The limitation of the process is that it requires high-pressure and elevated temperature for the anhydrous ethanol production.

U.S. Pat. No. 4,422,903 (1983) to J. R. Messick, et al. discloses an improved distillation method and apparatus for recovering anhydrous ethanol from fermentation or synthetic feedstock. The system includes at least one stripper-rectifier tower, a dehydrating tower, and an azeotropic agent stripping tower at higher pressure than the stripper-rectifier tower, and also condenses the overhead vapours from the dehydrating tower. The drawback of the process is that it is multi-stage at elevated temperature and pressure. It also involves the use of azeotropic forming agents in the distillation process.

U.S. Pat. No. 4,428,798 (1984) to D. Zudkevitch, et al. discloses a process for separating low molecular weight alcohols, especially ethanol, from aqueous mixtures. The process involves subjecting alcohol-water mixtures to extraction and/or extractive distillation procedures. Extractive solvents useful for the process of this invention include phenols having at least six carbon atoms and a boiling point between 180° C. and 350° C. The limitation of the process is the use of phenols as extractive solvents for the azeotropic distillation process at higher temperature and pressure. Moreover, the removal of phenol from dehydrated ethanol is also essential.

U.S. Pat. No. 4,455,198 (1984) to D. Zudkevitch, et al. discloses a process for ethanol concentration from ethanol-water mixtures by extraction or extractive distillation with a solvent, a cyclic ketone of at least seven carbons or cyclic alcohol of at least eight carbons such a cyclohexylcyclohexanone or cyclohexylcyclohexanol. The preferred solvents are also non-toxic, such that the alcohol can be used for human consumption. The limitations of the process are the use of azeotropic forming agents and the extractive distillation process involved in distillation process. U.S. Pat. No. 4,559,109 (1985) to F. M. Lee, et al. discloses a process for producing anhydrous ethanol from an ethanol-water mixture feedstock comprising subjecting the feedstock to distillation in a first distillation zone to produce an overhead vapours of from 80 to 90 weight percent ethanol, subjecting the thus produced overhead vapours to extractive distillation in an extractive distillation zone to produce anhydrous ethanol vapour overhead of about 99.5 weight percent ethanol and a solvent-rich bottom stream. The drawback of the process is the azeotropic distillation involves the use of toxic solvents as the azeotrope-forming agent.

U.S. Pat. No. 4,620,857 (1986) to E. Vansant, et al. discloses a process for the porous solid such as a zeolite or clay can be degassed to make it suitable as an adsorbent, after which the entrances of the pores are narrowed to a desired size by treating the porous solid with chemisorbable materials such as diborane. The limitations of the process are that the diborane used for the narrowing of the pores is highly reactive and toxic and the narrowing of the pores may not be uniform.

U.S. Pat. No. 4,645,569 (1987) to T. Akabane, et al. discloses a process for producing anhydrous ethanol using an apparatus comprising a combination of a concentration column, an azeotropic distillation column, and a solvent recovery column, capable of effectively utilizing the vapour at the top of the concentration column and the azeotropic distillation column. The limitation of the process is that the extractive distillation process consumes a very high amount of energy.

U.S. Pat. No. 4,654,123 (1987) to L. Berg, et al. discloses a process for the separation of alcohol/water using extractive distillation in which the water is removed as overhead product and the ethanol and extractive agent as bottoms and subsequently separated by conventional rectification. Typical examples of suitable extractive agents are hexahydrophthalic anhydride; methyl tetrahydrophthalic anhydride and pentanol-1; trimellitic anhydride, ethyl salicylate and resorcinol. The limitations of the process are that the extractive distillation process involves multiple steps and involves the use of toxic azeotropic forming agents.

U.S. Pat. No. 4,692,218 (1987) to H. Houben, et al. discloses a method and apparatus for simultaneously producing various forms of alcohol, including ethanol, which can likewise be withdrawn from the apparatus simultaneously. To this end, successive columns in the individual processing stages, each of which includes distillation, rectification, purification and dehydration, are connected in parallel for product flow but in series for energy flow and conservation. The limitations of the process are that it involves different process stages and requires high amount of energy.

U.S. Pat. No. 5,035,776 (1991) to J. P. Knapp discloses a thermally integrated extractive distillation process for recovering anhydrous ethanol from fermentation or synthetic feed stocks with four distillation columns. In the first step, the dilute ethanol water mixture is concentrated by distillation. The concentrated ethanol in the first distillation column is then distilled at higher pressures in the second and third distillation column to get the azeotropic mixture of ethanol and water. The azeotropic mixture thus produced is then subjected to extractive distillation to get anhydrous ethanol. The limitations of the process are that it involves multi-stage distillation and extractive distillation for the production of anhydrous ethanol.

In one approach, a chemical vapour deposition technique was used for controlling the pore opening size of the zeolites by the deposition of silicon alkoxide for the size/shape selective separation of molecules [M. Niwa et al., JCS Faraday Trans. I, 1984, 80, 3135-3145; M. Niwa et al., J. Phys. Chem., 1986, 90, 6233-6237; Chemistry Letters, 1989, 441-442; M. Niwa et al., Ind. Eng. Chem. Res., 1991, 30, 38-42; D. Ohayon et al., Applied Catalysis A- General, 2001, 217, 241-251]. Chemical vapour deposition is carried out by taking a requisite quantity of zeolite in a glass reactor, which is thermally activated at 450° C. in situ under inert gas like nitrogen flow. The vapours of silicon alkoxide are continuously injected into inert gas stream, which carries the vapours to zeolite surface where alkoxide chemically reacts with silanol groups of the zeolite. Once the desired quantity of alkoxide is deposited on the zeolite, sample is heated to 550° C. in air for 4-6 hours after which it is brought down to ambient temperature and used for adsorption. The major disadvantages of this technique are: (i) Chemical vapour deposition, which leads to non-uniform coating of alkoxide which in turn results in non-uniform pore mouth closure; (ii) The process has to be carried out at elevated temperature where the alkoxide gets vaporised; (iii) The deposition of the alkoxide requires to be done at a slow rate for better diffusion; and (iv) This method is expensive and lack of a commercial level at higher scale will be difficult.

To summarize, the known processes are complex, require other additives (such as benzene or ether), which significantly increase cost and potential hazard during use, and fail to provide a safe, efficient, simple method of operation. The applicant's invention described and claimed herein below attempts to meet this need.

OBJECT OF THE INVENTION

The main object of the present invention is to provide a process for the preparation of a molecular sieve adsorbent for the adsorptive dehydration of alcohols, which obviates the drawbacks as detailed above.

Still another object of the present invention is to prepare a molecular sieve-type adsorbent for the dehydration of the alcohols.

Still another object of the present invention is to provide an adsorbent, which can be prepared by the external surface modification of the microporous solids like zeolites to have molecular sieving effect.

Yet another object of the present invention is to have a uniform deposition of alkoxide on the surface of the zeolites.

Yet another object of the present invention is to prepare a molecular sieve adsorbent with high thermal and hydrothermal stability.

Yet another object of the present invention is to prepare an adsorbent, which selectively adsorbs water from water-alcohol mixtures and can be used commercially for the separation and dehydration of alcohols.

SUMMARY OF THE INVENTION

This invention relates to the use of pore mouth control of microporous solids for developing novel molecular sieve adsorbents and their potential in the drying of alcohols. More specifically, the invention relates to the manufacture and use of a molecular sieve adsorbent, which selectively adsorbs water from azeotropic alcohol-water mixtures, by pore mouth control of microporous solids with liquid phase metal alkoxide deposition on the external surface at ambient conditions of temperature and pressure. Thus, prepared adsorbent is useful for the commercial drying of alcohols.

DETAILED DESCRIPTION OF THE INVENTION

Accordingly, the present invention provides a process for the preparation of a molecular sieve adsorbent for the adsorptive dehydration of alcohols; said process comprising the steps of:

a) obtaining a molecular sieve adsorbent represented by the chemical formula, $(Na_2O)_6 \cdot (Al_2O_3)_6 \cdot (SiO_2)_{12} \cdot (M_{2/n}O_2)_x \cdot wH_2O$, where M is Si, Al, Zr, Ti, n its valance, the values of x varies from 0.001 to 0.1 and w being the number of moles of water;

b) activating the molecular sieve adsorbent in the temperature range of 350 to 450° C. to eliminate physically adsorbed water, for a period ranging from 3 to 6 hours;

c) cooling the activating the molecular sieve adsorbent in a desiccators under vacuum in the range of $10^{-2}$ to $10^{-4}$ torr;

d) treating the activated adsorbent with alkoxide solution of metal M in a dry solvent in the concentration range of 0.1 to 1.0 wt %/volume for a period in the range of 4 to 8 hours under continuous stirring;

e) recovering the solvent by conventional techniques for re-use;

f) drying the treated activated adsorbent of step (d) in air in static condition at ambient temperature in the range of 20 to 35° C.;

g) converting the alkoxide deposited on modified adsorbent into silica by calcining the same in the temperature range of 450 to 600° C. for a period ranging from 3 to 8 hrs, and h) obtaining the adsorbent by cooling the same at ambient temperature in static condition or by treating the activated adsorbent with the vapours of the alkoxide at a temperature range of 80-150° C. for a period of 2-6 hours.

In an embodiment of the present invention, commercially available adsorbent may used for the preparation of the molecular sieve adsorbent.

In another embodiment of the present invention, the adsorbent was activated at 350 to 550° C. for 3-6 hours followed by cooling under inert or vacuum condition.

In another embodiment of the present invention, the alkoxide was dissolved in dry solvent, which may be selected from like toluene, benzene, xylene and cyclohexane.

In still another embodiment of the present invention, the alkoxides used are tetra methyl orthosilicate, tetra ethyl orthosilicate, titanium iso-propoxide, zirconium iso-propoxide and aluminium iso-propoxide.

In another embodiment of the present invention, 0.10 to 1.00 weight percentage of alkoxide may be deposited onto the zeolite in a single step by treating the activated adsorbent with a solution of alkoxide in dry solvent for 4 to 8 hours.

In still another embodiment of the present invention, said alkoxide may be deposited in the range of was carried out at alkoxide concentration of 0.10 to 1.00% by weight of the adsorbent.

In still another embodiment of the present invention, the alkoxide deposition may be carried out in liquid phase for a period ranging from 4 to 8 hours under continuous stirring at ambient temperature.

In another embodiment of the present invention, the alkoxide may be deposited onto the zeolite in a single step vapour phase process by treating the activated adsorbent with the vapours of the alkoxide at a temperature range of 80-150° C. for a period of 2-6 hours.

In still another embodiment of the present invention, the alkoxide deposition may be uniform on the surface of the adsorbent.

In still another embodiment of the present invention, the solvent was recovered by distillation method preferably under vacuum distillation and can be re-used.

In still another embodiment of the present invention, the adsorbents are dried in air or under vacuum conditions.

In still another embodiment of the present invention, the adsorbent is calcined in the temperature range 500 to 600° C., preferably at 550° C.

In the present invention, we report a novel process to control the pore size of microporous solids like zeolites, which selectively adsorb water from alcohol-water azeotropic mixtures. Furthermore this adsorbent displays high thermal and hydrothermal stability.

Microporous solids like zeolites are finding increased applications as adsorbents for separating mixtures of closely related compounds. These have a three dimensional network of basic structural units consisting $SiO_4$ and $AlO_4$ tetrahedrons linked to each other by sharing apical oxygen atoms. Silicon and aluminium atoms lie in the centre of the tetrahedral. The resulting alumno-silicate structure, which is generally highly porous, possesses three-dimensional pores the access to which is through molecular sized windows. In a hydrated form, the preferred zeolites are generally represented by the following formula, $M_{2/n}O \cdot Al_2O_3 \cdot xSiO_2 \cdot wH_2O$, where M is a cation, which balances the electrovalence of the tetrahedral and is generally referred to as extra framework exchangeable cation, n represents the valancy of the cation and x and w represents the moles of $SiO_2$ and water respectively.

The attributes which make the zeolites attractive for separation include an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions.

Structural analysis of the samples was done by X-ray diffraction where in the crystallinity of the zeolites are measured from the intensity of the well-defined peaks. The in situ X-ray powder diffraction measurements at 30° C., 100° C., 200° C., 300° C., 400° C., 500° C., 600° C., 650° C., 700° C., 750° C., 800° C. and 850° C. shows that the newly developed adsorbent have high thermal stability. X-ray powder diffraction was measured using PHILIPS X'pert MPD system equipped with XRK 900 reaction chamber.

Microporous solid powder with a chemical composition $[Na_{12}(AlO_2)_{12} \cdot (SiO_2)_{12} \cdot wH_2O]$ was used as the starting material. X-ray diffraction data showed that the starting material was highly crystalline. A known amount of the powder $[Na_{12}(AlO_2)_{12} \cdot (SiO_2)_{12} \cdot wH_2O]$ was activated at 400° C. to remove the water adsorbed and mixed thoroughly with a solution having known amount of alkoxide in 100 ml dry solvent, the sample was dried by evaporating solvent under reduced pressure and the alkoxide species deposited on the solids surface was converted into silica by calcinations of the zeolite at 550° C.

Water, methanol and ethanol adsorption were studied gravimetrically after activating the sample at 400° C.

Advantages of the present invention include:

1. The adsorbent, prepared by the modification of microporous solid selectively adsorbs water over alcohols;
2. The adsorbent is prepared by a simple liquid phase or vapour phase alkoxide deposition;
3. The alkoxide deposition is uniform on the external surface of the microporous solid;
4. The metal alkoxide deposition is carried out at ambient temperature and pressure;
5. The solvent used for the alkoxide deposition can be recovered by distillation method;
6. The adsorbent shows very high thermal and hydrothermal stability; and
7. The adsorbent is useful in the commercial drying of alcohols.

Furthermore, the molecular sieve adsorbent obtained by the control of the pore mouth of the microporous solids with liquid phase metal alkoxide deposition on the external surface at ambient conditions of temperature and pressure involves:

(i) the deposition of alkoxide by chemically reacting alkoxide with silanol groups present on the external surface of the activated molecular sieve (zeolite) followed by calcination at 500-600° C., (ii) liquid phase or vapour phase chemical reaction of alkoxide in moisture free solvent to ensure uniform deposition of silica on the surface of the microporous solid at ambient conditions, (iii) enhancement of thermal and hydrothermal stability of the adsorbent by alkoxide deposition on the external surface of the solids, and (iv) preparation microporous solids based dehydrating adsorbent based on shape/size selectivity by controlling the pore mouths of the solids by depositing inorganic oxides on the external surface.

BRIEF DESCRIPTION OF THE TABLE

Table 1: The adsorption capacity and selectivity of all 18 absorbent samples are enumerated in Table 1 and correspond to the examples provided herein.

TABLE 1

| Sample | Amount Adsorbed in wt % | | |
|---|---|---|---|
| | Methanol | Ethanol | Water |
| Example-1 | 18.20 | 15.76 | 22.21 |
| Example-2 | 6.17 | 5.40 | 21.26 |
| Example-3 | 6.18 | 5.39 | 21.33 |
| Example-4 | 6.00 | 5.19 | 21.38 |
| Example-5 | 5.30 | 3.04 | 22.17 |
| Example-6 | 2.40 | 2.08 | 21.15 |
| Example-7 | 2.63 | 1.92 | 21.69 |
| Example-8 | 2.23 | 1.97 | 20.06 |
| Example-9 | 5.37 | 5.02 | 21.97 |
| Example-10 | 2.71 | 2.18 | 21.82 |
| Example-11 | 5.12 | 4.31 | 22.06 |
| Example-12 | 2.51 | 1.84 | 21.87 |
| Example-13 | 2.62 | 1.91 | 22.12 |
| Example-14 | 2.42 | 1.73 | 21.58 |
| Example-15 | 2.52 | 1.93 | 22.15 |
| Example-16 | 2.65 | 1.99 | 21.91 |
| Example-17 | 2.64 | 2.42 | 21.07 |
| Example-18 | 2.57 | 1.82 | 21.43 |

EXAMPLES

The following examples are given by way of illustration and therefore should not be constructed to limit the scope of the present invention.

Example-1

A known amount of microporous solid with chemical composition, $[(Na_2O)_6(Al_2O_3)_6.(SiO_2)_{12}.wH_2O]$, was activated at 400° C. and adsorption measurements were carried out by measuring the adsorption isotherms. Methanol, ethanol and water adsorption capacities are, 18.20%, 15.76% and 22.21% respectively and are given in Table 1.

Example-2

10.0 g of the solid powder $[Na_{12}(AlO_2)_{12}.(SiO_2)_{12}.wH_2O]$ was activated at 400° C. to remove the adsorbed water in the zeolite and stirred with 0.10 g tetra methyl orthosilicate in 100 ml dry toluene. The sample was dried after 5 hrs by evaporating solvent under reduced pressure. The tetra methyl ortho silicate species deposited on the external solid surface was converted into silica by calcinations of the solid at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 6.17%, 5.40% and 21.26% respectively and are given in Table 1.

Example-3

10.0 g of the solid powder with chemical composition, $[Na_{12}(AlO_2)_{12}.(SiO_2)_{12}.wH_2O]$ was activated at 400° C. to remove the water adsorbed in the solid and stirred with 0.10 g tetra ethyl orthosilicate in 100 ml dry solvent. The sample was dried after 5 hrs by evaporating solvent under reduced pressure. The tetra ethyl ortho silicate species deposited on the external surface of the solid was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 6.17%, 5.39% and 21.33% respectively and are given in Table 1.

Example-4

10.0 g of the solid powder with chemical composition, $[Na_{12}(AlO_2)_{12}.(SiO_2)_{12}.wH_2O]$ was activated at 400° C. to remove the water adsorbed in the solid and stirred with 0.15 g tetra ethyl orthosilicate in 100 ml dry toluene. The sample was dried after 5 hrs by evaporating toluene under reduced pressure. The tetra ethyl ortho silicate species deposited on the external surface of the solid was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 6.00%, 5.19% and 21.38% respectively and are given in Table 1.

Example-5

10.0 g of the solid powder with chemical composition, $[Na_{12}(AlO_2)_{12}.(SiO_2)_{12}.wH_2O]$ was activated at 400° C. to remove the water adsorbed in the zeolite and stirred with 0.20 g tetra ethyl orthosilicate in 100 ml dry toluene. The sample was dried after 5 hrs by evaporating toluene under reduced pressure. The tetra ethyl ortho silicate species deposited on the external surface solid was converted into silica by calcinations of the solid at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 5.30%, 5.04% and 22.17% respectively and are given in Table 1. 5.0 g of the adsorbent in was filled in a column and activated at 400° C. by passing 99.5% pure nitrogen gas to remove the adsorbed molecules. The activated adsorbent was cooled to room temperature under inert atmosphere. 25 ml ethyl alcohol-water mixture containing 95% ethyl alcohol was passed through the column and the product was analysed by Gas Chromatography and was found that the purity of the product ethanol was 99.9%.

Example-6

10.0 g of the solid $[Na_{12}(AlO_2)_{12}.(SiO_2)_{12}.wH_2O]$ was activated at 400° C. to remove the water adsorbed in the zeolite and stirred with 0.25 g tetra ethyl orthosilicate in 100 ml dry toluene. The sample was dried after 5 hrs by evaporating toluene under reduced pressure. The tetra ethyl ortho silicate species deposited on the external solid surface was converted into silica by calcinations of the solid at 500° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability Methanol, ethanol and water adsorption capacity values are 2.40%, 2.08% and 21.15% respectively and are given in Table 1.

Example-7

10.0 g of the solid [Na$_{12}$ (AlO$_2$)$_{12}$.(SiO$_2$)$_{12}$.wH$_2$O] was activated at 400° C. to remove the water adsorbed in the zeolite and stirred with 0.30 g tetra ethyl orthosilicate in 100 ml dry toluene. The sample was dried after 5 hrs by evaporating toluene under reduced pressure. The tetra ethyl ortho silicate species deposited on the external solid surface was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.63%, 1.92% and 21.69% respectively and are given in Table 1. 5.0 g of the adsorbent was filled in a column and activated at 400° C. by passing 99.5% pure nitrogen gas to remove the adsorbed molecules. The activated adsorbent was cooled to room temperature under inert atmosphere. 25 ml ethyl alcohol-water mixture containing 95% ethyl alcohol was passed through the column and the product was analysed by Gas Chromatography and was found that the purity of the product ethanol was 99.9%.

Example-8

10.0 g of the solid [Na$_{12}$ (AlO$_2$)$_{12}$.(SiO$_2$)$_{12}$.wH$_2$O] was activated at 400° C. to remove the water adsorbed in the zeolite and stirred with 1.00 g tetra ethyl orthosilicate in 100 ml dry toluene. The sample was dried after 5 hrs by evaporating toluene under reduced pressure. The tetra ethyl ortho silicate species deposited on the external solid surface was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.23%, 1.97% and 20.06% respectively and are given in Table 1. 5.0 g of the adsorbent was filled in a column and activated at 450° C. by passing 99.5% pure nitrogen gas to remove the adsorbed molecules. The activated adsorbent was cooled to room temperature under inert atmosphere. 25 ml methanol-water mixture containing 94% methanol was passed through the column and the product was analysed by Gas Chromatography and was found that the purity of the product methanol was 99.9%.

Example-9

10.0 g of the zeolite powder [Na$_{12}$ (AlO$_2$)$_{12}$.(SiO$_2$)$_{12}$.wH$_2$O] was activated at 400° C. to remove the water adsorbed in the zeolite and stirred with 0.20 g tetra methyl orthosilicate in 100 ml dry toluene. The sample was dried after 5 hrs by evaporating toluene under reduced pressure. The tetra methyl ortho silicate species deposited on the zeolite surface was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 5.37%, 5.02% and 21.97% respectively and are given in Table 1. 5.0 g of the adsorbent in was filled in a column and activated at 400° C. by passing 99.5% pure nitrogen gas to remove the adsorbed molecules. The activated adsorbent was cooled to room temperature under inert atmosphere. 25 ml ethyl alcohol-water mixture containing 95% ethyl alcohol was passed through the column and the product was analysed by Gas Chromatography and was found that the purity of the product ethanol was 99.9%.

Example-10

10.0 g of the solid [Na$_{12}$(AlO$_2$)$_{12}$.(SiO$_2$)$_{12}$.wH$_2$O] was activated at 400° C. to remove the water adsorbed in the zeolite and stirred with 0.25 g tetra methyl orthosilicate in 100 ml dry benzene. The sample was dried after 5 hrs by evaporating benzene under reduced pressure. The tetra methyl ortho silicate species deposited on the solid surface was converted into silica by calcinations of the zeolite at 500° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.71%, 2.18% and 21.82% respectively and are given in Table 1. 5.0 g of the adsorbent was filled in a column and activated at 450° C. by passing 99.5% pure nitrogen gas to remove the adsorbed molecules. The activated adsorbent was cooled to room temperature under inert atmosphere. 25 ml methanol-water mixture containing 94% methanol was passed through the column and the product was analysed by Gas Chromatography and was found that the purity of the product methanol was 99.9%.

Example-11

10.0 g of the solid [Na$_{12}$(AlO$_2$)$_{12}$.(SiO$_2$)$_{12}$.wH$_2$O] was activated at 400° C. to remove the water adsorbed in the zeolite and stirred with 0.20 g tetra ethyl orthosilicate in 100 ml dry benzene. The sample was dried after 5 hrs by evaporating benzene under reduced pressure. The tetra ethyl ortho silicate species deposited on the solid external surface was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 5.12%, 4.31% and 22.06% respectively and are given in Table 1. 5.0 g of the adsorbent in Example-7 was filled in a column and activated at 400° C. by passing 99.5% pure nitrogen gas to remove the adsorbed molecules. The activated adsorbent was cooled to room temperature under inert atmosphere. 25 ml ethyl alcohol-water mixture containing 95% ethyl alcohol was passed through the column and the product was analysed by Gas Chromatography and was found that the purity of the product ethanol was 99.9%.

Example-12

10.0 g of the solid [Na$_{12}$(AlO$_2$)$_{12}$.(SiO$_2$)$_{12}$.wH$_2$O] was activated at 400° C. to remove the water adsorbed in the zeolite and stirred with 0.25 g tetra ethyl orthosilicate in 100 ml dry cyclohexane. The sample was dried after 5 hrs by evaporating cyclohexane under reduced pressure. The tetra ethyl ortho silicate species deposited on the external solid surface was converted into silica by calcinations of the zeolite at 600° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.51%, 1.84% and 21.87% respectively and are given in Table 1. 5.0 g of the adsorbent was filled in a column and activated at 450° C. by passing 99.5% pure nitrogen gas to remove the adsorbed molecules. The activated adsorbent was cooled to room temperature under inert atmosphere. 25 ml methanol-water mixture containing 94% methanol was passed through the column and the product was analysed by Gas Chromatography and was found that the purity of the product methanol was 99.9%.

Example-13

10.0 g of the solid $[Na_{12}(AlO_2)_{12}.(SiO_2)_{12}.wH_2O]$ was activated at 400° C. to remove the water adsorbed in the zeolite and stirred with 0.25 g tetra methyl orthosilicate in 100 ml dry cyclohexane. The sample was dried after 5 hrs by evaporating cyclohexane under reduced pressure. The tetra methyl ortho silicate species deposited on the external solid surface was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.62%, 1.91% and 22.12% respectively and are given in Table 1. 5.0 g of the adsorbent in was filled in a column and activated at 400° C. by passing 99.5% pure nitrogen gas to remove the adsorbed molecules. The activated adsorbent was cooled to room temperature under inert atmosphere. 20 ml n-propyl alcohol-water mixture containing 93% n-propyl alcohol was passed through the column and the product was analysed by Gas Chromatography and was found that the purity of the product n-propyl alcohol was 99.9%.

Example-14

10.0 g of the solid $[Na_{12}(AlO_2)_{12}.(SiO_2)_{12}.wH_2O]$ was activated at 400° C. to remove the water adsorbed in the zeolite and stirred with 0.25 g tetra ethyl orthosilicate in 100 ml dry xylene. The sample was dried after 5 hrs by evaporating xylene under reduced pressure. The tetra ethyl ortho silicate species deposited on the external solid surface was converted into silica by calcinations of the zeolite at 550° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.42%, 1.73% and 21.58% respectively and are given in Table 1. 5.0 g of the adsorbent was filled in a column and activated at 400° C. by passing 99.5% pure nitrogen gas to remove the adsorbed molecules. The activated adsorbent was cooled to room temperature under inert atmosphere. 20 ml isopropyl alcohol-water mixture containing 92% isopropyl alcohol was passed through the column and the product was analysed by Gas Chromatography and was found that the purity of the product isopropyl alcohol was 99.9%.

Example-15

10.0 g of the solid $[Na_{12}(AlO_2)_{12}.(SiO_2)_{12}.wH_2O]$ was activated at 400° C. to remove the water adsorbed in the zeolite and stirred with 0.30 g titanium iso-propoxide in 100 ml dry xylene. The sample was dried after 5 hrs by evaporating xylene under reduced pressure. The titanium iso propoxide species deposited on the external solid surface was converted into titania by calcinations of the zeolite at 550° C. A known amount of the sample was activated at 400° C. under vacuum and adsorption measurements were carried out as described earlier. Methanol, ethanol and water adsorption capacity values are 2.52%, 1.93% and 22.15% respectively and are given in Table 1.

Example-16

10.0 g of the solid powder $[Na_{12}(AlO_2)_{12}.(SiO_2)_{12}.wH_2O]$ was activated at 400° C. to remove the water adsorbed in the zeolite and stirred with 0.35 g zirconium iso propoxide in 100 ml dry xylene. The sample was dried after 5 hrs by evaporating xylene under reduced pressure. The zirconium iso propoxide species deposited on the solid surface was converted into zirconia by calcinations of the zeolite at 550° C. A known amount of the sample was activated at 400° C. under vacuum and adsorption measurements were carried out as described earlier. Methanol, ethanol and water adsorption capacity values are 2.65%, 1.99% and 21.91% respectively and are given in Table 1.

Example-17

10.0 g of the solid powder $[Na_{12}(AlO_2)_{12}.(SiO_2)_{12}.wH_2O]$ was activated at 400° C. to remove the water adsorbed in the solid and stirred with 0.20 g aluminium iso propoxide in 100 ml dry xylene. The sample was dried after 5 hrs by evaporating xylene under reduced pressure. The aluminium iso propoxide species deposited on the zeolite surface was converted into alumina by calcinations of the zeolite at 500° C. A known amount of the sample was activated at 400° C. under vacuum and adsorption measurements were carried out as described earlier. Methanol, ethanol and water adsorption capacity values are 2.69%, 2.42% and 21.07% respectively and are given in Table 1.

Example-18

10.0 g of the solid powder $[Na_{12}(AlO_2)_{12}.(SiO_2)_{12}.wH_2O]$ was activated at 400° C. to remove the water adsorbed in the zeolite and stirred with 0.25 g tetra methyl orthosilicate in 100 ml dry xylene. The sample was dried after 5 hrs by evaporating xylene under reduced pressure. The tetra methyl ortho silicate species deposited on the zeolite surface was converted into silica by calcinations of the zeolite at 650° C. A known amount of the sample was activated at 400° C. under vacuum and adsorption measurements were carried out as described earlier. In situ X-ray powder diffraction measurements at various temperatures up to 850° C. shows that the adsorbent has high thermal and hydrothermal stability. Methanol, ethanol and water adsorption capacity values are 2.57%, 1.82% and 21.43% respectively and are given in table 1. 5.0 g of the adsorbent in was filled in a column and activated at 400° C. by passing 99.5% pure nitrogen gas to remove the adsorbed molecules. The activated adsorbent was cooled to room temperature under inert atmosphere. 25 ml ethyl alcohol-water mixture containing 95% ethyl alcohol was passed through the column and the product was analysed by Gas Chromatography and was found that the purity of the product ethanol was 99.9%.

The adsorption capacity and selectivity of all the 18 adsorbent samples are enumerated in Table-1.

That which is claimed is:

1. A process for the preparation of a molecular sieve adsorbent for adsorptive dehydration of alcohols, said process comprising the steps of:
    a) obtaining a molecular sieve adsorbent represented by the chemical formula: $(Na_2O)_6 \cdot (Al_2O_3)_6 \cdot (SiO_2)_{12} \cdot (M_{2/n}O_2)_x \cdot wH_2O$, where M is the element selected from Si, Al, Zr and Ti; n its valance, the values of x varies from 0.001 to 0.1, and w is the number of moles of water;
    b) activating the molecular sieve adsorbent at a temperature in the range of 350 to 450° C. to eliminate physically adsorbed water, for a period ranging from 3 to 6 hours;
    c) cooling the activated the molecular sieve adsorbent under vacuum in the range of $10^{-2}$ to $10^{-4}$ torr;
    d) treating the activated adsorbent with an alkoxide of element M in a dry solvent;
    e) drying the treated activated adsorbent of step (d) in air in static condition at a temperature in the range of 15 to 40° C.;
    f) converting the alkoxide deposited on modified adsorbent into silica by calcining the same in a temperature range of 450 to 600° C. for a period ranging from 3 to 8 hrs, and
    g) obtaining the adsorbent by cooling the calcined product of step (g) at ambient temperature in static condition.

2. The process of claim 1, wherein the preferred temperature of activation of molecular sieve adsorbent is about 400° C.

3. The process of claim 1, wherein the alkoxide of step (d) is selected from the group consisting of: tetra methyl orthosilicate, tetra ethyl orthosilicate, titanium iso-propoxide, zirconium iso-propoxide, and aluminium iso-propoxide.

4. The process of claim 1, wherein the dry solvent of step (d) is selected from the group consisting of: toluene, benzene, cyclohexane, and xylene.

5. The process of claim 4, wherein the activated adsorbent is treated with the alkoxide of element M in a dry solvent in the in the concentration range of 0.1 to 1.0 wt %/volume for a period in the range of 4 to 8 hours under continuous stirring.

6. The process of claim 4, wherein the activated adsorbent is treated with the vapours of alkoxide in the temperature range of 80 to 150° C. for a period in the range of 2 to 6 hours.

7. The process of claim 1, wherein in step (d) the treatment of activated molecular sieve is performed by treating with alkoxide solution of element M or with vapours of alkoxide.

8. The process of claim 7, wherein in step (d), 0.10 to 1.0 weight percent of metal alkoxide is deposited uniformly on the surface of activated adsorbent.

9. The process of claim 1, wherein said metal alkoxide deposition on the microporous solid surface is carried out in a simple liquid phase reaction at ambient temperature and pressure conditions with constant stirring.

10. The process of claim 1, wherein in step (g), the temperature of calcinations is about 550° C.

11. The process of claim 1, wherein the calcinations time is about 4 hours.

12. The process of claim 1, wherein the adsorbent prepared is useful for the dehydration of alcohols and the recovery of alcohol is 99.9%.

13. A process for the preparation of a molecular sieve adsorbent for the adsorptive dehydration of alcohols using a molecular sieve adsorbent represented by the chemical formula: $(Na_2O)_6 \cdot (Al_2O_3)_6 \cdot (SiO_2)_{12} \cdot (M_{2/n}O_2) \cdot wH_2O$, where M is Si, Al, Zr, Ti; n its valancy, the values of x varies from 0.001 to 0.1 and w being the number of moles of water, which comprises activating the molecular sieve at temperature in a range of 350 to 450° C. to eliminate physically adsorbed water for a period ranging from 3 to 6 hours; cooling the solid under vacuum in a range of $10^{-2}$ to $10^{-4}$ torr; treating the activated solid with a solution of alkoxide in a dry solvent for a period of 4 to 8 hours; and heating the alkoxide deposited solid in the temperature range of 450 to 600° C. for a period ranging from 3 to 8 hours.

14. A process for the preparation of a molecular sieve adsorbent for the adsorptive dehydration of alcohols using a molecular sieve adsorbent represented by the chemical formula: $(Na_2O)_6 \cdot (Al_2O_3)_6 \cdot (SiO_2)_{12} \cdot (M_{2/n}O_2)_x \cdot wH_2O$, where M is Si Al, Zr, Ti; n its valancy, the values of x varies from 0.001 to 0.1 and w being the number of moles of water, which comprises activating the molecular sieve at temperature in the range of 350 to 450° C. to eliminate physically adsorbed water for a period ranging from 3 to 6 hours; cooling the solid under vacuum in the range of $10^{-2}$ to $10^{-4}$ torr; treating the activated solid with vapours of the alkoxide at a temperature range of 80 to 150° C. for a period of 2-to 6 hours; heating the alkoxide deposited solid in the temperature range of 450 to 600° C. for a period ranging from 3 to 8 hours.

* * * * *